THRESHOLD SYSTEM
Filed Feb. 21, 1966
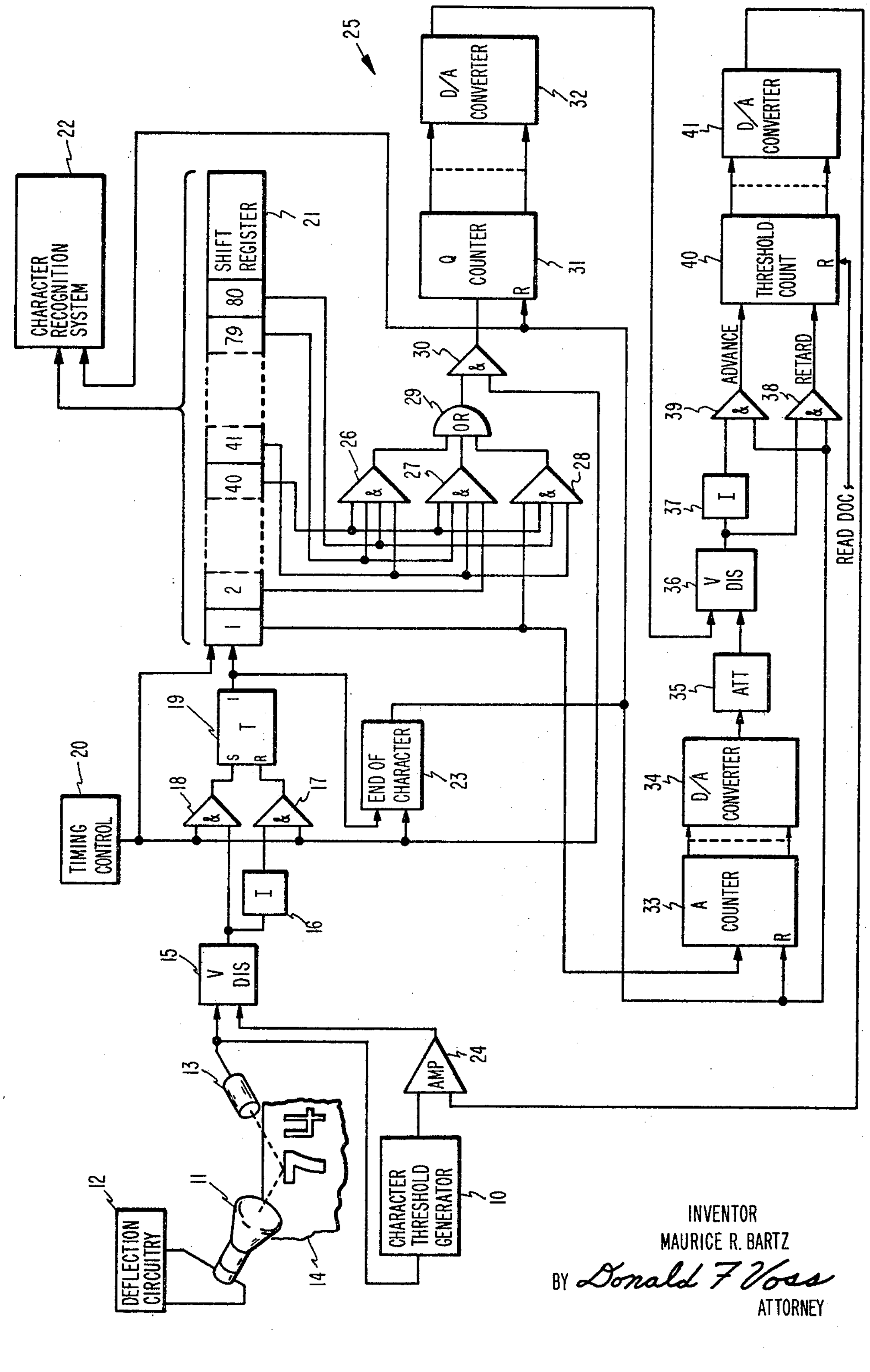
INVENTOR
MAURICE R. BARTZ
BY Donald F Voss
ATTORNEY 3,479,642
Patented Nov. 18, 1969

3,479,642
THRESHOLD SYSTEM

Maurice R. Bartz, Rochester, Minn., assignor to International Business Machines, Armonk, N.Y., a corporation of New York Filed Feb. 21, 1966, Ser. No. 529,090
Int. Cl. G06k *9/00;* G06f *7/38;* G06g *7/00*
U.S. Cl. 340—146.3 6 Claims

ABSTRACT OF THE DISCLOSURE

A threshold system for a character recognition machine is provided which includes both a character line width and a character contrast threshold generator. Bits entering the first position of a shift register receiving digitized video data advances an area counter while other shift register positions are applied to AND circuits which when satisfied advance a group counter. Changes in character line width are obtained by converting the counter values to analog signals, attenuating the area analog signal and applying the signals to a voltage discriminator. The output of the voltage discriminator is applied via an inverter to one AND gate and directly to another control the advance and retard of a preset bi-directional threshold counter. The threshold counter output is converted to an analog signal which is combined by an operational amplifier with the output of a character contrast threshold generator. The output of the operational amplifier is applied as a threshold level to a voltage discriminator which also receives the analog video signal.

This invention relates to apparatus for providing a threshold level to facilitate digitizing an analog input signal and more particularly to apparatus for adjusting a threshold or clipping level according to the width of characters being scanned in a character recognition system.

In many character recognition systems, some type of wave form is generated in response to scanning a character. This wave form is then digitized to represent the scanned character. The digital information is then operated upon to provide recognition of the scanned character. Since the digital information is based upon whether or not the analog wave form exceeds a given threshold level at selected points in time, characters having the same identity but consisting of different line widths would result in different digital data patterns unless the threshold level were adjusted according to line width. This invention involves an improved system for adjusting a threshold level according to the line width of the characters being scanned.

The problem of characters having different line widths emanates primarily from two sources over which there is very little control. Documents to be read by character recognition machines are prepared by a multitude of business machines having different type font styles. This alone creates a line width problem. Another source of the problem is the fact that line width varies with ribbon life. Characters printed at the beginning of ribbon life are usually wider than characters printed toward the end of ribbon life. Further, in the case of quarterly or semiannual reports, it is not uncommon for the document to have been prepared on a weekly or monthly basis from different business machines, particularly where the document is prepared by means of a typewriter. Thus, there is a need for adjusting the threshold from character to character based upon line width. Of course, there is also the need to provide threshold adjustment when scanning within a character. This invention provides a unique character line width threshold generator and combines its output with the output of a well known character threshold generator to provide a final video threshold which is compared with the analog video signal to determine whether the video is black or white. The output of the character line width threshold generator can be considered as a bias lever for the character threshold generator.

Accordingly, a principal object of this invention is to provide an improved character line width threshold generator.

Another object of the invention is to provide a threshold system for a character recognition machine which includes both a character line width and a character threshold generator.

Still another object of the invention is to provide a character line width threshold generator which is relatively simple and inexpensive.

The foregoing and other objects, features and advantages of the invention will be apparent from the following more particular description of a preferred embodiment of the invention, as illustrated in the accompanying drawings.

In the drawing:

The figure is a schematic logic diagram illustrating the invention.

With reference to the drawing, the character threshold generator 10 is of the type shown and described in Patent 2,975,371 by E. C. Greanias for Clipping Level Control Circuit, dated Mar. 14, 1961 and no further description of it is necessary. The character line width generator 25 is an improvement over the one shown and described in the commonly assigned co-pending application Ser. No. 466,034 for Scanner Threshold Adjusting Circuit by G. L. Shelton, Jr. In the present invention, several operators in the form of logical AND circuits 26, 27 and 28 examine the data shifted through shift register 21 in synchronism with scanning a character on document 14 by means of cathode ray tube 11 and photomultiplier 13. The total number of times any of the logical AND circuits 26, 27 and 28 are satisfied, per character being scanned, is the Q count referred to in the Shelton, Jr. application. The value Q is developed in a nine bit binary counter 31. The outputs of logical AND circuits 26, 27 and 28 are connected to inputs of logical OR circuit 29 which has its output connected to an input of logical AND circuit 30. Logical AND circuit 30 also has an input for receiving timing signals from timing control 20. The output of logical AND circuit 30 is connected to advance counter 31. Counter 31 is initially reset and thereafter is reset after each character has been scanned. End of character circuit 23 provides a signal for resetting counter 31. The end of character circuit 23 can be merely a counter for counting the number of vertical scans required for scanning a character on document 14 and providing an output signal after the required number of scans are completed.

Cathode ray tube 11 is of the type well known in the art and the beam thereof is deflected by well known deflection circuitry 12 so as to scan characters on document 14 in a series of horizontally adjacent vertical scans. Light reflected from document 14 in response to the beam of cathode ray tube 11 scanning a character, impinges upon photomultiplier tube 13. The output of photomultiplier tube 13 is the analog video signal and it is applied to an input of voltage discriminator 15. This analog video signal is compared by the voltage discriminator 15 with the video threshold signal from operational amplifier 24. If the analog video signal is greater than the threshold level, the output of voltage discriminator 15 is considered to be black or at a one level, whereas if the analog video signal is less than the threshold level, then the output of 15 is considered white or at a zero level. Thus, the output of voltage discriminator 15 can be considered as quantized video data.

This quantized video data is then digitized by means of signals from timing control 20. The output of voltage discriminator 15 is applied to an input of inverter 16 and to an input of logical AND circuit 18. The output of inverter 16 is applied to an input of logical AND circuit 17. Logical AND circuits 17 and 18 each have an input for receiving timing signals from timing control 20. The output of logical AND circuit 17 is applied to the reset input of trigger 19 while its set input is connected to the output of logical AND circuit 18. The set output of trigger 19 represents digitized video data and it is connected to the input of shift register 21. Shift register 21 is shifted by timing signals from timing control 20. The shift register 21 and timing control 20 can be as shown in the article entitled "Shift Register" by R. Zeman on page 600, vol. 7, No. 7, December 1964, IBM Technical Disclosure Bulletin.

The total number of black bits within a pattern or character to develop the A value referred to in the Shelton application is derived by counting the number of black bits applied to position 1 of shift register 21. This is accomplished by means of counter 33 which is a nine bit binary counter. In this invention, a line width servo mechanism evaluates the quantity $Q/A$ by comparing it to a fixed constant K. The constant K is related to an average line width. For example, if $Q/A$ is equal to 0.67, the average line width of the pattern is approximately three bits. In this invention, the value Q is not divided by the value A. Rather, the values Q and A are converted to analog signals and the value A is multiplied by the constant K. Specifically, the value in counter 31 is converted to an analog signal by means of the digital to analog converter 32 which is of the type well known in the prior art. The value in counter 33 is also converted to an analog signal by the digital to analog converter 34 and the output of 34 is applied to attenuator 35 which functions to multiply the analog signal from 34 by the constant K. The output of digital to analog converter 32 and attenuator 35 is applied to inputs of voltage discriminator 36. Voltage discriminator 36 compares KA to Q and generates an output which indicates whether KA is greater or less than Q. This is equivalent to determining whether $Q/A$ is greater than or less than K. It should be recognized that other ways could be used to measure line width and still come within the scope of this invention. In this invention, a change in line width is sought. The change is either toward or away from the constant K. As it will be seen shortly, the change in line width is used to control retarding or advancing a threshold counter which is initially reset to a predetermined value. The value in the threshold counter is then converted to an analog threshold signal.

The output of voltage discriminator 36 is sampled after a character has been scanned. This is accomplished by connecting the output of voltage discriminator 36 to an input of inverter 37 and to an input of logical AND circuit 38. The output of inverter 37 is connected to an input of logical AND circuit 39. Logical AND circuits 38 and 39 are conditioned by a signal from the end of character circuit 23. The outputs of logical AND circuits 38 and 39 are applied to threshold counter 40 to retard and advance the same respectively. Threshold counter 40 is a four position binary counter and in this expamle is initially reset to 8 prior to scanning characters on a document or upon a Read Document command from any suitable control device such as from character recognition system 22. Thereafter, the value in counter 40 is appropriately adjusted after each character is scanned. The output of counter 40 is applied to a digital to analog converter 41 which develops an analog signal from the value in counter 40. The output of the digital to analog converter 41 is connected to an input of amplifier 24 which functions to sum this analog input with the input signal from character threshold generator 10. The Q and A counters 31 and 33 are reset by the end of character signal from 23. The end of character signal also provides an indication of the character recognition system 22 that it should consider the data in the shift register 21 at that time. The character recognition system 22 of course, can be any suitable system and it does not form a part of the invention, but is merely included to show the utility of the invention.

From the foregoing it is seen that the threshold level applied to discriminator 15 is varied according to character width from character to character and is also varied according to optical conditions within a character. Further, it is seen that the range of $Q/A$ is determined through the facility of a voltage discriminator and no analog division circuitry is required. The character width video threshold is adjusted after each character simply by changing the value in the forward and backward threshold counter 40. It should also be recognized that it is possible to scan a line of characters prior to recognition in order to stabilize the line width threshold generator during the recognition mode of operation.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A line width threshold generator for generating a threshold signal as the function of character line width of characters scanned in a character recognition machine which includes means for measuring character line widths and means responsive to said measuring means for generating signals indicative of changes in line width, the combination comprising:

a bi-directional counter, a digital to analog converter connected to said bi-directional counter for developing a plurality of threshold levels for values therein, and means responsive to changes in character line widths from character to character for advancing said bi-directional counter if the line width is increasing and retarding said counter if the line width is decreasing.

2. A threshold generating system for a character recognition machine which includes a scanner for generating an analog video signal in response to scanning characters comprising:

means for generating a first analog threshold signal as a character is being scanned, means for generating a second analog threshold signal after each character has been scanned, means for combining said first and second threshold signals to provide a final threshold signal to facilitate comparison with an analog video signal for determining whether the video is black or white at given points of time, and means responsive to said combining means and said analog video signal for generating an output signal at one level if said analog video signal is greater than said final threshold signal and for generating an output signal at another level if said analog video signal is less than said final threshold signal.

3. A line width threshold generator for generating a threshold signal as a function of character line width of characters scanned in a character recognition machine comprising:

means for developing values indicative of the width of lines being scanned, means responsive to said values for indicating increasing and decreasing changes in line widths, a bi-directional threshold counter pre-settable to a predetermined value, a digital to analog converter connected to the output of said counter to develop a plurality of threshold levels from values therein, and
means responsive to increasing and decreasing changes in line widths for advancing and retarding said bi-directional counter respectively.

4. Apparatus for generating a variable threshold signal for comparison with an analog data signal comprising:
means for digitizing said analog data signal with said threshold signal initially set at a predetermined level,
data storage means for sequentially storing the digitized data signals,
logic means operative to develop an output signal in responsive to etch time predetermined data bit sequences exist in said storage means,
a first counter for counting the number of output signals from said logic means over the time period occupied by said analog data signal,
a first digital to analog converter connected to said first counter to develop a first analog measurement signal,
a second counter connected to count each data bit entered into said data storage means,
a second digital to analog converter connected to said second counter to develop a second analog measurement signal,
means for multiplying said second analog measurement signal by a constant to develop a modified second analog measurement signal,
means for comparing said first and said modified second analog measurement signals and providing advance and retard signals if said first analog measurement signal is greater than and less than said modified second analog measurement signal respectively,
a bi-directional counter pre-settable to a predetermined value and connected to said comparing means to be advanced and retarded by said advance and retard signals therefrom, and
means for developing threshold signals from the values in said bi-directional counter.

5. The apparatus of claim 4 wherein said multiplying means is an attenuator.

6. The apparatus of claim 4 wherein said comparing means comprises:
a voltage discriminator connected to develop positive and negative output signals when said first measurement signal is greater than and less than said modified second measurement signal respectively, and
logic means responsive to said negative output signal for developing a retard signal and responsive to said positive signal to develop an advance signal.

References Cited

UNITED STATES PATENTS

| | | | |
|---|---|---|---|
| 2,836,356 | 5/1958 | Forrest et al. | 235—154 |
| 3,106,699 | 10/1963 | Kamentsky | 340—146.3 |
| 3,263,216 | 7/1966 | Andrews | 340—146.3 |
| 3,069,079 | 12/1962 | Steinbuch et al. | 340—146.3 XR |
| 3,192,505 | 6/1965 | Rosenebatt | 340—146.3 |
| 3,341,814 | 9/1967 | Chow | 340—146.3 |

MAYNARD R. WILBURN, Primary Examiner.

S. SHEINBEIN, Assistant Examiner

U.S. Cl. X.R.

235—92